United States Patent [19]

Otawa et al.

[11] Patent Number: 4,897,298
[45] Date of Patent: Jan. 30, 1990

[54] LAMINATE AND MOLDED ARTICLE PREPARED THEREFROM

[75] Inventors: Yasuhiko Otawa; Kunihide Hiraoka; Toshiyuki Maeda, all of Ichihara; Katsuo Okamoto, Funabashi; Noboru Sakamaki, Ichihara; Shizuo Shimizu, Houya, all of Japan

[73] Assignee: Mitsui Petrochemical Industries, Ltd., Tokyo, Japan

[21] Appl. No.: 248,901

[22] Filed: Sep. 26, 1988

Related U.S. Application Data

[62] Division of Ser. No. 114,594, Oct. 30, 1987.

[30] Foreign Application Priority Data

Oct. 30, 1986 [JP] Japan .................. 61-256872
Dec. 11, 1986 [JP] Japan .................. 61-293482
Dec. 15, 1986 [JP] Japan .................. 61-296797

[51] Int. Cl.$^4$ .............................. E06B 7/16
[52] U.S. Cl. ........................ 428/122; 49/441; 428/358; 428/424.2; 428/475.8; 428/483
[58] Field of Search ............. 49/441; 428/122, 424.2, 428/475.8, 483, 358

[56] References Cited

U.S. PATENT DOCUMENTS

| | | | |
|---|---|---|---|
| 2,840,416 | 6/1958 | Woodward | 49/483 X |
| 3,854,247 | 12/1974 | Stark et al. | 49/495 |
| 3,953,655 | 4/1976 | Steinkamp et al. | 428/475.8 |
| 4,212,787 | 7/1980 | Matsuda et al. | 525/211 X |
| 4,419,408 | 12/1983 | Schmukler et al. | 428/476.1 X |
| 4,442,167 | 4/1984 | Iwasa et al. | 428/408 X |
| 4,448,835 | 5/1984 | Yamaguchi | 428/122 X |
| 4,572,871 | 2/1986 | Mabuchi et al. | 428/423.1 |
| 4,572,872 | 2/1986 | Yamazaki et al. | 428/423.1 |
| 4,684,578 | 8/1987 | Inoue et al. | 428/476.3 X |
| 4,704,820 | 11/1987 | Kisanuki | 49/441 |
| 4,706,628 | 12/1972 | Azzola | 428/122 |
| 4,758,477 | 7/1988 | Okano et al. | 428/476.1 X |
| 4,783,931 | 11/1988 | Kirkwood | 428/122 X |

Primary Examiner—Henry F. Epstein
Attorney, Agent, or Firm—Sherman and Shalloway

[57] ABSTRACT

A laminate comprising (a) a layer of a partially cross-linked graft-modified polyolefin elastomer formed by dynamically heat-treating a mixture of a peroxide-cross-linking olefin copolymer rubber and an olefinic plastic with an unsaturated carboxylic acid or derivative thereof, an unsaturated epoxy monomer or an unsaturated hydroxy monomer in the presence of an organic peroxide and (b) a layer of a polyamide, polyurethane or polyester is excellent in weatherability, heat resistance and dimension stability, and this laminate is effectively molded into an interior part or sealing material of an automobile, especially a glass run channel. The glass run channel molded from this laminate is excellent in the durability, the tightness of contact with glass at the time of closing and the sliding smoothness at the opening-closing operation.

18 Claims, 2 Drawing Sheets

Fig. 4-A
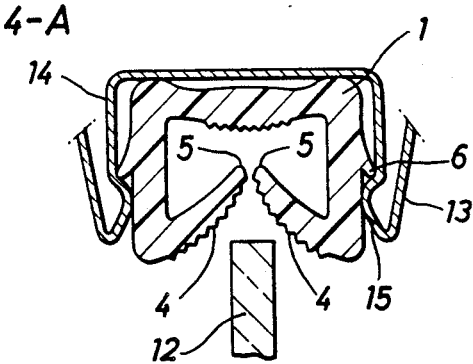
Fig. 4-B
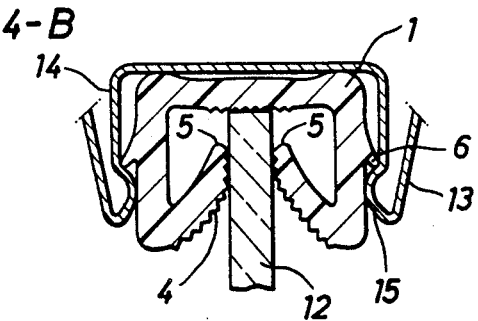

LAMINATE AND MOLDED ARTICLE PREPARED THEREFROM

This is a division of application Ser. No. 114,594, filed Oct. 30, 1987.

BACKGROUND OF THE INVENTION

(1) Field of Invention

The present invention relates to a laminate comprising a thermoplastic elastomer layer and a polyamide, polyurethane or polyester layer and a molded article formed therefrom. More specifically, the present invention relates to a laminate comprising a layer composed of a partially crosslinked graft-modified polyolefin elastomer obtained by dynamically heat-treating a mixture of a peroxide-crosslinked olefin copolymer rubber and an olefinic plastic with an unsaturated carboxylic acid or derivative thereof, an unsaturated epoxy monomer or an unsaturated hydroxy monomer in the presence of an organic peroxide and a layer composed of a polyamide, polyurethane or polyester, which is valuable as automobile interior parts or sealing materials, and also to a glass run channel molded from this laminate.

(2) Description of the Prior Art

A polyvinyl chloride sheet having an embossed surface and a leather pattern boarded thereon has been used for automobile interior parts such as a floor, a wall or a ceiling panel.

However, since a plasticizer is incorporated in polyvinyl chloride, this polyvinyl chloride sheet is defective in that the surface of the sheet is made sticky by the plasticizer or the sheet becomes hard or the interior of an automobile becomes foggy because of evaporation of the plasticizer.

Instead of this single sheet of polyvinyl chloride, there has been used a laminate comprising a polyvinyl chloride sheet backed with a foamed layer and, if necessary, a resin aggregate layer. This laminate is prepared through the following steps.

(1) Soft polyvinyl chloride is calendered to form a sheet.

(2) The surface of the sheet is coated with a mixture of a polyol and a polyisocyanate and delustering is effected by a urethane treatment.

This delustering treatment is performed so as to prevent the sheet surface from becoming glossy at the heat molding step (7) described below.

(3) The sheet surface is embossed to form a boarded leather pattern on the sheet surface.

(4) The back surface of the sheet having the embossed surface is subjected to a flame treatment to melt the back surface portion, and a foamed polyurethane sheet supplied separately is press-bonded to the molten back surface by means of a roll.

(5) An adhesive layer is further formed on the foamed polyurethane sheet side of the resulting laminate comprising the polyvinyl chloride sheet and the foamed polyurethane sheet.

(6) A resin aggregate having a predetermined shape is formed by heat molding such as vacuum forming or compressed air forming.

(7) The polyvinyl chloride/foamed polyurethane/adhesive laminate is preliminarily heated, and the laminated is placed on the shaped resin aggregate and the assembly is integrated by heat molding.

The conventional laminate to be used as an interior part is defective in that the preparation process is complicated as described above.

However, troubles such as the sticky surface and the fogging of the interior of an automobile similarly arise in case of this laminate, because a polyvinyl chloride sheet containing a plasticizer is used.

A glass run channel, which is one important sealing material for an automobile, has in the cross-section thereof a groove-like body portion and a tongue-like strainer portion expanded from the vicinity of the top of the side wall of the groove-like body portion toward the center.

In the conventional glass run channel, in order to attain good parting of the strainer portion from the glass contact part and prevent contamination of glass, a nylon film or the like is applied to the surface of glass contact part by bonding, and in order to decrease the area of contact with glass, an embossing treatment is conducted before or after lamination of the nylon film or the like.

As other materials, there can be mentioned (1) a composite material comprising a cured rubber composed mainly of an ethylene/propylene/diene copolymer rubber excellent in weatherability and heat resistance, an adhesive and a nylon fiber, (2) a composite material comprising the above-mentioned cured rubber and an adhesive excellent in abrasion resistance, and (3) soft polyvinyl chloride for profile extrusion molding. The materials (1) and (2) are excellent in weatherability, heat resistance and dimensional stability because they comprise as the base material a cured ethylene/propylene/diene copolymer rubber excellent in weatherability, and resistance. However, the preparation process comprises the step of kneading the ethylene/propylene/diene copolymer rubber with a filler, the extrusion molding step, the surface buffing step, the adhesive coating step, the drying step, and the fiber implanting step and the preparation process is very complicated. On the other hand, since the material (3) is formed by profile extrusion molding of soft polyvinyl chloride, the preparation process is simplified, but the material (3) is insufficient in heat resistance or dimensional stability and is inferior to the materials (1) and (2) in practical performances.

SUMMARY OF THE INVENTION

We made research with a view to providing a laminate in which the defects such as the surface stickiness and the fogging of the interior of an automobile are eliminated and which is excellent in heat resistant and valuable as interior part of a vehicle such as an automobile. As the result, it was found that the foregoing object can be attained by a laminate comprising a layer composed mainly of a specific thermoplastic elastomer and a layer composed mainly of a polyamide or polyurethane. It also was found that a glass run channel having the above-mentioned laminate structure is excellent in the durability, the tightness of contact with glass at the time of closing and the sliding smoothness to glass at the opening-closing operation. We have now completed the present invention based on these findings.

More specifically, in accordance with the present invention, there is provided a laminate comprising a layer composed of (a) a partially crosslinked graft-modified polyolefin elastomer formed by dynamically heat-treating a blend comprising (i) 10 to 100 parts by weight of a peroxide-crosslinked olefin copolymer, (ii) 0 to 90 parts by weight of an olefinic plastic, the sum of the amounts of the components (i) and (ii) being 100 parts by weight, and (iii) 0.01 to 10 parts by weight of at least one monomer selected from the group of ① an unsaturated carboxylic acid or derivative thereof, ② an unsaturated epoxy monomer and ③ an unsaturated hydroxy monomer in the presence of an organic peroxide, and a layer of (b) a polyamide, polyurethane or polyester.

In accordance with one preferred embodiment of the present invention, there is provided a laminate as set forth above, wherein the graft-modified polyolefin elastomer (a) further comprises (iv) 0 to 100 parts by weight of a peroxide-non-crosslinking rubbery substance and/or 0 to 200 parts by weight of a mineral oil type softener.

Furthermore, in accordance with the present invention, there is provided a glass run channel having in the cross-section thereof a groove-like body portion and a tongue-like strainer portion expanded from the vicinity of the top of the side wall of the groove-like body portion toward the center, which is composed of the olefinic thermoplastic elastomer, wherein at least a part, falling in contact with glass, of the surface of the strainer portion is laminated with a lubricating resin layer through a modified olefin thermoplastic elastomer layer having repeated fine convexities and concavities on the surface thereof so that the repetition of the fine convexities and concavities is retained on the surface of the lubricating resin layer.

In the present invention, a partially crosslinked graft-modified polyolefin elastomer formed by dynamically heat-treating a mixture of a peroxide-crosslinking olefin copolymer rubber and an olefinic plastic with an unsaturated carboxylic acid or derivative thereof, an unsaturated epoxy monomer or an unsaturated hydroxy monomer in the presence of an organic peroxide is used for a thermoplastic elastomer layer as the base layer, and by laminating this thermoplastic elastomer layer with a layer composed of a polyamide, polyurethane or polyester, there can be obtained a laminate excellent in the interlaminar adhesion, the heat resistance and the dimension stability, which is suitable as an interior part or sealing material of an automobile and is valuable for the production of furniture, construction materials, household electric appliance housing, bag, sport good, office supplies and the like.

BRIEF DESCRIPTION OF THE DRAWINGS

FIGS. 3, 4-A and 4-B are diagrams illustrating the attachment of the glass run channel to an automobile.

DETAILED DESCRIPTION OF THE PREFERRED EMBODIMENTS

Figure 1:
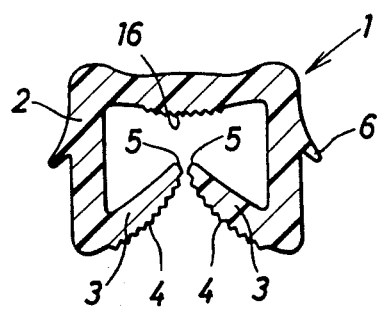
FIG. 1 is a view showing the sectional structure of the glass run channel of the present invention.

In the present invention, the thermoplastic elastomer constituting the layer (a) is a graft-modified polyolefin elastomer composed of a partially crosslinked olefin copolymer rubber and an olefinic plastic preferably a peroxide-decomposing olefin plastic, and therefore, the thermoplastic layer has an excellent flowability, a high heat resistance, a high resistance against aging and a good rubbery elasticity.

A polyamide which is one resin constituting the layer (b) has a high oil resistance and a high scratch resistance, and by dint of the presence of the polyamide layer, predetermined oil resistance and scratch resistance are maintained on one surface of the laminate.

A polyurethane which is another resin constituting the layer (b) has a high oil resistance and a high scratch resistance, and by dint of the presence of the polyurethane layer, predetermined oil resistance and scratch resistance are maintained on one surface of the laminate.

If the layer (b) is formed of a foamed polyurethane, good softness and light weight characteristic can be imparted to the laminate.

Moreover, if the layer (b) is composed of a polyester, one surface of the formed laminate retains good oil resistance and scratch resistance.

The reason why the merits of both of the graft-modified polyolefin elastomer and the polyamide, polyurethane or polyester are sufficiently exerted in the laminate of the present invention is that the elastomer is uniformly modified with an unsaturated carboxylic acid or derivative thereof or an unsaturated epoxy monomer, which easily forms a physical or chemical bonding to the polyamide, polyurethane or polyester.

Namely, in the laminate of the present invention, the bonding strength of the lamination interface between the layer (a) and (b) is much higher than the bonding strength attained when the thermoplastic elastomer is used in the unmodified state or when a third component having a segment compatible with the polyamide or polyurethane is incorporated in the unmodified thermoplastic elastomer, and therefore, the above-mentioned advantages are attained.

According to the present invention, by the actions of the respective components, there can be provided a laminate which is excellent in the oil resistance, the mechanical strength and the resistance against aging.

The present invention will now be described in detail.

Thermoplastic elastomer layer (a)

Thermoplastic elastomer used for the layer (a) in the laminate of the present invention is a graft-modified polyolefin elastomer, which is prepared by blending (i) 10 to 100 parts by weight, preferably 10 to 95 parts by weight, especially preferably 60 to 95 parts by weight, of a peroxide-crosslinking olefin copolymer rubber, (ii) 0 to 90 parts by weight, preferably 5 to 90 parts by weight, especially preferably 5 to 40 parts by weight, of an olefinic plastic (the sum of the amounts of the components (i) and (ii) is 100 parts by weight) and (iii) 0.01 to 10 parts by weight, especially 0.1 to 5 parts by weight of at least one monomer selected from the group of ① an unsaturated carboxylic acid or derivative thereof, ② an unsaturated epoxy monomer and ③ an unsaturated hydroxy monomer and dynamically heat-treating the blend in the presence of an organic peroxide to effect partial crosslinking.

If the copolymer rubber component (i) is used in an amount within the above-mentioned range, a composition excellent in rubbery characteristics such as rubbery elasticity and moldability can be obtained.

If the olefinic plastic (ii) is incorporated in an amount within the above-mentioned range, a composition excellent in rubbery characteristics such as rubbery elasticity, and flowability and moldability can be obtained.

The moldability and heat bondability can be improved if the unsaturated carboxylic acid or derivative thereof, unsaturated epoxy monomer or unsaturated hydroxy monomer (iii) is used in an amount within the above-mentioned range.

In order to improve the moldability of the obtained thermoplastic elastomer, it is preferred that in addition to the above mentioned components (i) through (iii), (iv) 0 to 100 parts by weight, preferably 5 to 50 parts by weight, especially preferably 5 to 50 parts by weight, of a peroxide-non-crosslinking rubbery substance, and (v) 0 to 200 parts by weight, preferably 3 to 100 parts by weight, especially preferably 5 to 80 parts by weight, of a mineral oil softener be incorporated per 100 parts by weight of the sum of the amounts of the components (i) and (ii) into the blend to be heat-treated.

(i) Peroxide-crosslinking olefin copolymer rubber

The peroxide-crosslinking olefin copolymer rubber used in the present invention is an amorphous elastic copolymer comprising an olefin as the main component, such as an ethylene/propylene copolymer rubber, an ethylene/propylene/non-conjugated diene rubber and an ethylene/butadiene copolymer rubber, and a rubber having such a property that if the rubber is mixed with an organic peroxide and kneaded under heating, the flowability is reduced or lost altogether. As the non-conjugated diene, there can be mentioned dicyclopentadiene, 1,4-hexadiene, dicyclooctadiene, methylene-norbornene and 5-ethylidene-2-norbornene.

Of these copolymer rubbers, an ethylene/propylene copolymer rubber and an ethylene/propylene/non-conjugated diene rubber are preferably used, and a copolymer rubber in which the molar ratio between ethylene units and propylene units (ethylene/propylene molar ratio) is from 50/50 to 90/10, especially from 55/45 to 85/15, is preferred. An ethylene/propylene/non-conjugated diene copolymer rubber, particularly an ethylene/propylene/5-ethylidene-2-norbornene copolymer rubber or an ethylene/propylene/5-ethylidene-2-norbornene/dicyclopentadiene quadripolymer, is especially preferred because a thermoplastic elastomer excellent in heat resistance, tensile characteristics and repulsion elasticity can be obtained.

In order to obtain a composition excellent in the tensile characteristics and flowability, it is preferred that the Mooney viscosity $ML_{1+4}$ (100° C.) of the copolymer rubber be 10 to 120, especially 40 to 80.

It also is preferred that the iodine value (unsaturated degree) of the copolymer rubber be smaller than 16. If this requirement is satisfied, a thermoplastic elastomer which is well-balanced between the flowability and the rubber properties can be obtained.

(ii) Olefinic plastic

The olefinic plastic used in the present invention is a crystalline high-molecular-weight solid product obtained by polymerizing at least one mono-olefin according to the high-pressure method or low-pressure method.

For example, there can be mentioned isotactic and syndiotactic mono-olefin homopolymer and copolymer resins, and typical monoolefin polymer resins are commercially available.

As preferred examples of the monoolefin, there can be mentioned ethylene, 1-butene, 1-pentene, 1-hexene, 2-methyl-1-propene, 3-methyl-1-pentene, 4-methyl-1-pentene and 5-methyl-1-hexene.

In the present invention, a peroxide-decomposing olefinic plastic and polyethylene are especially preferred as the olefinic plastic.

By the peroxide-decomposing olefinic plastic is meant an olefinic plastic having such a property that if the olefinic plastic is mixed with a peroxide and kneaded under heating, the molecular weight is decreased by thermal decomposition and the flowability of the resin is increased. For example, there can be mentioned isotactic polypropylene and copolymers of propylene with a minor amount of other α-olefin, such as a propylene/ethylene copolymer, a propylene/1-hexene copolymer and a propylene/4-methyl-1-pentene copolymer. It is preferred that the melt index (ASTM D-1238-65T, 230° C.) of the incorporated olefinic plastic be 0.1 to 50, especially 5 to 20. In the present invention, the olefinic plastic exerts the effects of improving the flowability and heat resistance of the elastomer.

(iii) Unsaturated carboxylic acid or derivative thereof, unsaturated epoxy monomer or unsaturated hydroxy monomer In the present invention, as the unsaturated carboxylic acid or derivative thereof as the component (iii), there can be used α,β-unsaturated carboxylic acids such as acrylic acid, methacrylic acid, maleic acid, fumaric acid, itaconic acid, citraconic acid and tetrahydrophthalic acid, unsaturated carboxylic acids such as bicyclo(2,2,1)hept-2-ene-5,6-dicarboxylic acid, α,β-unsaturated carboxylic anhydrides such as maleic anhydride, itaconic anhydride, citraconic anhydride and tetrahydrophthalic anhydride, unsaturated carboxylic anhydrides such as bicyclo(2,2,1)hept-2-ene-5,6-dicarboxylic anhydride, and unsaturated carboxylic acid esters such as methyl acrylate, methyl methacrylate, dimethyl maleate, monomethyl maleate, diethyl fumarate, dimethyl itaconate, diethyl citraconate, dimethyl tetrahydrophthalate and dimethyl bicyclo(2,2,1)hept-2-ene-5,6-dicarboxylate. Of these compounds, maleic acid, bicyclo(2,2,1)hept-2-ene-5,6-dicarboxylic acid and anhydrides thereof are preferred.

As the unsaturated epoxy monomer used as the component (iii) in the present invention, there can be mentioned, for example, glycidyl esters of unsaturated monocarboxylic acids such as glycidyl acrylate, glycidyl methacrylate and glycidyl p-styrylcarboxylic acid, monoglycidyl and diglycidyl esters of unsaturated polycarboxylic acids such as maleic acid, itaconic acid, citraconic acid, butene-tricarboxylic acid, endo-cis-bicyclo(2,2,1)hept-5-ene-2,3-dicarboxylic acid and endo-cis-bicyclo(2,2,1)hept-5-ene-2-methyl-2,3-dicarboxylic acid, unsaturated glycidyl ethers such as allylglycidyl ether, 2-methylallylglycidyl ether, o-allylphenol glycidyl ether, m-allylphenol glycidyl ether, m-allylphenol glycidyl ether, p-allylphenol glycidyl ether, isopropenylphenol glycidyl ether, o-vinylphenol glycidyl ether, m-vinylphenol glycidyl ether and p-vinylphenol glycidyl ether, and 2-(o-vinylphenyl)-ethylene oxide, 2-(p-vinylphenyl)-ethylene oxide, 2-(o-vinylphenyl)-propylene oxide, 2-(p-vinylphenyl)-propylene oxide, 2-(o-allylphenyl)-ethylene oxide, 2-(p-allylphenyl)-ethylene oxide, 2-(o-allylphenyl)-propylene oxide, 2-(p-allylphenyl)-propylene oxide, p-glycidylstyrene, 3,4-epoxy-1-butene, 3,4-epoxy-3-methyl-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene mono-oxide and allyl-2,3-epoxycyclopentyl ether.

The unsaturated hydroxy monomer as another component (iii) is a monomer having at least one ethylenic unsaturated bond and at least one hydroxyl group. For example, there can be mentioned hydroxyethyl acrylate, hydroxypropyl acrylate, hydroxyethyl methacrylate, hydroxypropyl methacrylate, polyethylene glycol monomethacrylate and polypropylene glycol monomethacrylate. Hydroxyethyl (meth)acrylate and hydroxypropyl (meth)acrylate are especially preferred.

The component (iii) acts as a grafting modifier at the dynamic heat treatment described hereinafter to reinforce the blend interface between the polyamide and the graft-modified polyolefin elastomer.

(iv) Peroxide-non-crosslinking-rubbery substance

A hydrocarbon type rubbery substance having such a property that even if the rubber substance is mixed with a peroxide and kneaded under heating, the rubbery substance is not crosslinked and the flowability is not reduced is used as the peroxide-non-crosslinking rubbery substance (iv). For example, there can be mentioned polyisobutylene, butyl rubber, a propylene/ethylene copolymer rubber having a propylene content of at least 70 mole % and atactic polypropylene. In view of the performance and the handling easiness, polyisobutylene is especially preferred as the component (iv).

The component (iv) exerts a function of improving the flowability of the thermoplastic elastomer. It is preferred that the Mooney viscosity of the component (iv) be lower than 60.

(v) Mineral oil type softener

The mineral oil type softener as the component (v) is a high-boiling-point petroleum fraction ordinarily used for weakening the intermolecular force of a rubber in roll processing of the rubber to facilitate the processing, assisting the dispersion of carbon black or white carbon incorporated as the filler, or reducing the hardness of a cured rubber to increase the softness and elasticity, and this fraction includes a paraffin type, a naphthene type and an aromatic type.

Preparation of graft-modified polyolefin elastomer

The elastomer constituting the layer (a) of the laminate of the present invention is prepared by blending the above-mentioned amounts of the components (i) through (iii), if necessary together with the above-mentioned amount of the component (iv) and/or (v), and dynamically heat-treating the blend in the presence of an organic oxide to effect partial crosslinking.

A fibrous filler, polyolefin plastic, filler or colorant can be incorporated in the obtained thermoplastic elastomer, so far as the flowability (moldability), the rubbery characteristics and the bondability to the polyamide or polyurethane or polyester layer are not degraded. As the fibrous filler, there can be mentioned glass fiber and potassium titanate fiber. As the polyolefin plastic, there can be mentioned high-density polyethylene, medium-density polyethylene, low-density polyethylene, isotactic polypropylene and a propylene/α-olefin copolymer.

As the filler, there can be mentioned calcium carbonate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, shirasu baloon and carbon fiber, and as the colorant, there can be mentioned carbon black, titanium oxide, zinc flower, red iron oxide, ultramarine, prussian blue, an azo pigment, a nitroso pigment, a lake pigment and a phthalocyanine pigment.

Furthermore, in the present invention, known heat stabilizers such as phenol type, sulfite type, phenylalkane type, phosphite type and amine type stabilizers, aging-preventing agents, weathering agents, antistatic agents, and lubricants such as metal soaps and waxes can be incorporated in amounts customarily used for olefinic plastics or olefin copolymer rubbers.

In the present invention, the blend comprising the above-mentioned components is dynamically heat-treated in the presence of an organic peroxide to effect partial crosslinking and prepare a modified polyolefin elastomer. By the dynamic heat treatment is meant kneading in the molten state.

As the organic peroxide used in the present invention, there can be mentioned dicumyl peroxide, di-tert-butyl peroxide, 2,5-dimethyl-2,5-di(tert-butylperoxy)hexane, 2,5-dimethyl-2,5-di-(tert-butylperoxy)hexine-3, 1,3-bis(-tert-butylperoxyisopropyl)-benzene, 1,1-bis(tert-butylperoxy)-3,3,5-trimethylcyclohexane, n-butyl-4,4-bis(-tert-butylperoxy)valelate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these peroxides, in view of the smell and scorch stability, 2,5-dimethyl-2,5-di-(tert-butylperoxy)hexane, 2,5-dimethyl-2,5-di-(tert-butylperoxy)hexine-3, 1,3-bis(-tert-butylperoxyisopropyl)benzene, 1,1-bis(tert-butylperoxy)-3,3,5-trimethylcyclohexane and n-butyl-4,4-bis(tert-butylperoxy)valelate are preferred, and 1,3-bis(-tert-butylperoxyisopropyl)benzene is most preferred.

The organic peroxide is incorporated in an amount of 0.05 to 3% by weight, especially 0.1 to 1% by weight, based on the total amount of the components (i), (ii) and (iii).

If the organic peroxide is incorporated in an amount within the above-mentioned range, an excellent moldability is attained without degradation of excellent heat resistance, tensile characteristics and rubbery properties such as elastic recovery and repulsion elasticity.

Known kneading devices such as an open mixing roll, a closed Banbury mixer, an extruder, a kneader and a continuous mixer can be used.

It is preferred that kneading be carried out in a closed apparatus in an atmosphere of an inert gas such as nitrogen or carbon dioxide gas. The kneading temperature is such that the half-value period of the used organic peroxide is shorter than 1 minute. More specifically, the kneading temperature is ordinarily 150° to 280° C. and preferably 170° to 240° C. The kneading time is ordinarily 1 to 20 minutes and preferably 1 to 10 minutes. The shearing force is selected so that the shearing speed is ordinarily 10 to $10^4$ sec$^{-1}$ and preferably $10^2$ to $10^3$ sec$^{-1}$.

In the present invention, at the partial crosslinking treatment with the organic peroxide, there can be used peroxy-crosslinking assistants such as p-quinone dioxime, p,p'-dibenzoylquinone dioxime, N-methyl-N,N-dinitrosoaniline, nitrobenzene, diphenylquanidine, trimethylolpropane-N,N'-m-phenylene maleimide and N-methyl-N,N'-m-phenylene dimaleimide, divinylbenzene, triallyl isocyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate. It is expected that if such a compound as described above is used, the crosslinking reaction will be advanced uniformly and mildly. In the present invention, especially, if divinylbenzene is used, since divinylbenzene is easy to handle, has a good compatibility with the olefinic plastic as the main component to be treated and acts as a dispersing agent for the organic peroxide by its organic peroxide-solubilizing action, a uniform crosslinking effect is attained by the heat treatment and a composition which is well-balanced between the flowability and the physical properties can be obtained. Therefore, use of divinylbenzene is most preferred in the present invention. In the present invention, it is preferred that the above-mentioned crosslinking agent or polyfunctional vinyl monomer be incorporated in an amount of 0.1 to 2% by weight, especially 0.3 to 1% by weight, based on the total amount of the components to be treated.

If the crosslinking agent or polyfunctional vinyl monomer is incorporated in an amount within the above-mentioned range, the flowability of the composition is improved, and even if the composition undergoes heat history, the physical properties are not changed.

A decomposition promotor may be incorporated so as to promote decomposition of the organic peroxide. As the decomposition promotor, there can be mentioned tertiary amines such as triethylamine, tributylamine and 2,4,6-tris(di-methylamino)phenol, and naphthenic acid salts of metals such as aluminum, cobalt, vanadium, manganese, magnesium, lead and mercury.

According to the present invention, by the dynamic heat treatment in the presence of the organic peroxide, partial crosslinking is effected and a thermoplastic polyolefin elastomer graft-modified with the component (iii) is obtained.

Incidentally, in the present invention, by the term "partial crosslinking", it is meant that the gel content is at least 20% preferably 20 to 98%, especially preferably 45 to 98%, as determined according to the following method.

Method for determination of gel content

About 100 mg of a sample of a thermoplastic elastomer is weighed and cut into small pieces having a size of 0.5 mm×0.5 mm×0.5 mm, and the cut pieces are immersed in 30 ml of cyclohexane at 23° C. for 48 hours in a sealed vessel. Then, the sample is recovered on a filter paper and dried at room temperature for more than 72 hours until the weight is not changed any more.

The weight of the cyclohexane-insoluble components except the polymer component (for example, fibrous filler, filler, pigment and the like) and the weight of the olefinic plastic in the sample before immersion in cyclohexane are substracted from the weight of the drying residue. The obtained value is designated as "corrected final weight (Y)".

The weight of the peroxide-crosslinking olefin copolymer in the sample (namely, the value obtained by subtracting ① the weight of olefinic plastic and ② the weight of the cyclohexane-soluble component other than the peroxide-crosslinking olefin copolymer rubber (for example, mineral oil and ③ and the weight of the cyclohexane-insoluble components other than the polymer component (for example, fibrous filler, filler, pigment and the like) from the weight of the sample) is designated as "corrected initial weight (X)".

The gel content is calculated according to the following formula:

$$\text{Gel content (\% by weight)} = \frac{\text{corrected final weight } (Y)}{\text{corrected initial weight } (X)} \times 100$$

Preparation of laminate

The laminate of the present invention can be prepared by laminating a layer (a) of the so-prepared graft-modified polyolefin elastomer with a layer (b) of a polyamide, polyurethane or polyester.

Polyamide layer (b)

As the polyamide used in the present invention, there can be mentioned polyamides obtained by polyamides obtained by polycondensing aliphatic, alicyclic and aromatic diamines such as hexamethylene diamine, decamethylene diamine, dodecamethylene diamine, 2,2,3- or 2,2,4-trimethylhexamethylene diamine, 1,3- or 1,4-bis(aminomethyl)cyclohexane, bis(p-aminocyclohexylmethane) and m- or p-xylene diamine with aliphatic, alicyclic and aromatic dicarboxylic acids such as adipic acid, suberic acid, sebacic acid, cyclohexane-dicarboxylic acid, terephthalic acid and isophthalic acid, polyamides obtained by condensing aminocarboxylic acids, such as $\epsilon$-aminocapronic acid and 11-aminoundecanoic acid, polyamides obtained from lactams such as $\epsilon$-caprolactam and $\omega$-laurolactam, copolyamides composed of these components and mixture of these polyamides. As specific example, there can be mentioned nylon 6, nylon 66, nylon 610, nylon 9, nylon 11, nylon 12, nylon 6/66, nylon 66/610 and nylon 6/11.

Polyurethane layer (b)

In the present invention, any of known polyurethanes can be used. For example, a polyester type polyurethane and a polyurethane, classified according to the kind of the starting polyol component, or a soft polyurethane, a semi-rigid polyurethane and a rigid polyurethane, classified according to the hardness, can be used in the present invention.

In the case where the laminate of the present invention is used as an interior part of a vehicle such as an automobile, it is preferred that the layer (b) be used in the form of a polyurethane sheet, and in this case, in view of the easiness of the lamination, use of a thermoplastic polyurethane is preferred.

Furthermore, in the present invention, a foamed polyurethane can be used for the layer (b). In this case, in view of the softness, heat resistance and sound-absorbing property, a soft foamed polyurethane having a substantially continuous cell structure and a foaming ratio of about 10 to about 100 can used.

Polyester layer (b)

In the present invention, as the polyester, there can be mentioned thermoplastic polyesters such as polyethylene terephthalate, polybutylene terephthalate and polyethylene isophthalate.

Structure of laminate

The laminate of the present invention can be obtained by laminating the above-mentioned thermoplastic elastomer layer (a) with the polyamide, polyurethane or polyester layer (b).

An optional lamination method can be adopted according to the shape and size of the end product and the required physical properties. For example, the laminate can be prepared according to the following methods.

(1) The preliminarily formed layers (a) and (b) are heat-fusion-bonded to each other at a temperature, at which at least one of the layers (a) and (b) is molten, by using a calender roll molding machine, a compression molding machine or the like.

(2) The preliminarily formed sheet layer (b) is heat-fusion-bonded to the layer (a) being extrusion-molded or calender roll.

(3) The layer (a) and (b) are simultaneously extruded and heat-fusion-bonded in a multi-layer extrusion molding machine.

In the case where a foamed polyurethane is used for the layer (b), a laminate excellent in the interlaminar adhesion can be obtained by extrusion-molding or calender-molding the graft-modified polyolefin elastomer into a sheet and laminating this sheet with a foamed polyurethane sheet by using a pressing roll.

In the so-prepared laminate of the present invention, in general, the thickness of the thermoplastic elastomer layer (a) is preferably 0.1 to 50 mm and the thickness of the polyamide, polyurethane or polyester layer (b) is preferably 5 $\mu$m to 10 $\mu$m, though these thicknesses are changed according to the intended use.

The laminate of the present invention is especially excellent in the interlaminar adhesion between the thermoplastic elastomer layer (a) and the polyamide or polyurethane layer (b), and the weight is lighter than the weight of a soft polyvinyl chloride sheet or like and the surface stickiness due to bleeding of a plasticizer or the like is not caused. Moreover, the laminate of the present invention is excellent in the heat resistance and dimensional stability. Accordingly, the laminate of the present invention can be effectively used for the production of not only interior parts or sealing materials of automobiles but also furniture, construction materials, household electric appliance housings, bags, sport goods and office supplies.

Glass run channel

According to the present invention, it has been found that a modified thermoplastic olefin elastomer as mentioned above is selected as the elastomer constituting at least a glass contact part of the glass run channel, this elastomer is molded so that the surface comes to have repeated fine convexities and concavities and a surface member composed of a polyamide, polyurethane or polyester is heat-fusion-bonded to the elastomer, the repetition of fine convexities and concavities can be reproduced on the surface member, and as the result, a glass run channel excellent in the durability, the tightness of contact to glass at the time of closing and the sliding smoothness at the opening-closing operation.

The glass run channel of the present invention has in the cross-section thereof a groove-like body portion and a tongue-like strainer portion expanded from the vicinity of the top of the side wall of the groove-like portion toward the center, which is composed of an olefin thermoplastic elastomer, wherein at least a part, falling in contact with glass, of the surface of the strainer portion is laminated with a lubricating resin layer through a modified olefin thermoplastic elastomer layer having repeated fine convexities and concavities on the surface thereof so that the repetition of the fine convexities and concavities is retained on the surface of the lubricating resin layer.

Referring to FIG. 1 illustrating the sectional structure of the glass run channel, this glass run channel 1 has in the cross-section thereof a groove-like (⊐-shaped) body portion 2 and a tongue-like strainer portion 3 expanded from the vicinity of the top of the side wall of the body portion 1 toward the center. A pair of such strainer portions 3 extends slantwise toward the inner side of the groove of the body portion 2 and the outer surface sides of the strainer portion 3 form glass contact parts 4 and the top ends 5 are placed in such a positional relationship that they can be opended and closed. A hook 6 for attachment to a window frame is formed on the outer side wall of the body portion 2.

Figure 2:
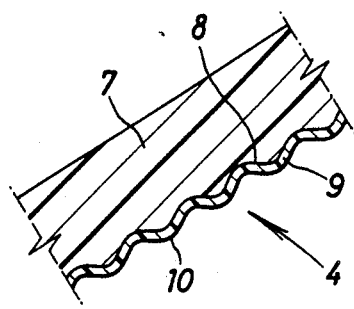
FIG. 2 is an enlarged view showing the glass contact part in the glass run channel shown in FIG. 1.

The body portion 2 and the strainer portion 3 are integrally formed of an elastomer, and according to the present invention, at least the glass contact parts 4 are constructed by a modified olefin thermoplastic clastomer and a lubricating resin layer. Referring to FIG. 2, which is an enlarged view showing this glass contact part 4, a base 7 composed of a modified olefin thermoplastic elastomer has a surface 8 having repeated fine convexities and concavities (shark skin surface). A lubricating resin layer 9 is laminated on this surface by heat fusion bonding and a surface 10 having repeated fine convexities and concavities is similarly formed on the outer surface of the lubricating resin layer 9.

Figure 3:
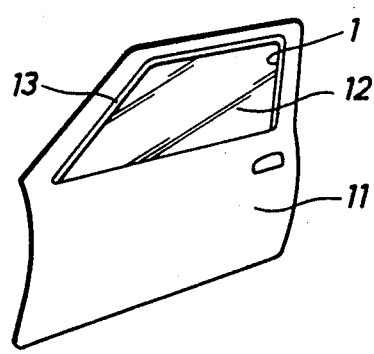

Referring to FIGS. 3, 4-A and 4-B illustrating the attachment of this glass run channel to an automobile, a windowpane 12 is mounted on an automobile door 11 so that the windowpane 12 can be opened and closed by a vertical motion, and a glass run channel 1 as described above is secured to a window frame 13. Namely, as shown in FIGS. 4-A and 4-B, the window frame 13 is formed to have a ⊐-shaped section as a whole and an inward projection 15 is formed as inlet of a concave portion 14 of the window frame. The glass run channel 1 is inserted in this concave portion 14 and an engaging hook 6 of the glass run channel 1 is engaged with the projection 15 to secure the glass run channel 1 to the window frame 13. As shown in FIG. 4-A, in the state where the windowpane 12 is brought down, the top ends 5 of the glass contact parts 4 are closed to confront each other. As shown in FIG. 4-B, in the state where the windowpane 12 is brought up, the top ends 5 are separated from each other by the inserted windowpane 12 but are contacted with the surface of the windowpane 12.

According to the present invention, on at least a part, falling in contact with glass, of the glass run channel 1, a base 7 of a modified thermoplastic olefin elastomer having a formed shark skin appearance and a surface member layer 9 of a thermoplastic resin having a lubricating property and polarity, which is heat-fusion-bonded to the surface of the base 7, are formed.

Since the modified thermoplastic olefin elastomer used in the present invention has thermoplastic characteristics, the elastomer can be molded into an optional shape and size, and the elastomer has such elasticity, softness and compressability as required for the glass contact part of the glass run channel. Moreover, since the elastomer is an olefinic elastomer, the elastomer is excellent in durability, weatherability and water resistance. In addition, since this elastomer is modified with a polar group-containing monomer such as maleic anhydride by graft copolymerization, the elastomer has a strong bondability to a thermoplastic resin having a lubricating property and a polarity, which is used as the surface member layer, and if the surface member resin layer is heat-fusion-bonded to the elastomer, a laminate structure excellent in the interlaminar adhesion strength not only just after bonding but also after the lapse of time or after the weatherability test can be formed.

Furthermore, it is easy to mold the modified thermoplastic olefin elastomer so that a shark skin appearance can be formed, and by combining this molding operation with the operation of heat-fusion-bonding the surface member, a shark skin pattern of fine convexities and concavities can be faithfully reproduced on the outer surface of the surface member layer. Reproduction of this shark skin pattern of fine convexities and concavities is very difficult according to the conventional adhesive-coating method, but this can be easily accomplished by the combination of the above-mentioned molding operation and heat-fusion-bonding operation according to the present invention.

According to the present invention, by adopting the above-mentioned structure, all of the adhesive-coating step, the adhesive-curing or adhesive-baking step and the embossing step conducted before or after the adhesive-coating step can be omitted, and a glass run channel can be easily prepared at a high efficiency through a small number of steps. Moreover, by forming the surface member layer of a polyamide, polyurethane or polyester, the friction coefficient to glass can be reduced and a shark skin convexity-concavity pattern which has a more uniform pitch and a higher fineness than the convexity-concavity pattern obtained by the conventional embossing treatment can be formed on the surface. Accordingly, while the windowpane is closed, tight contact (liquid-tight contact) with glass becomes possible, and when the windowpane is opened, the sliding resistance can be reduced. Therefore, the opening-closing operation can be performed very easily and smoothly.

A polyamide or polyurethane is preferably used as the lubricating resin constituting the above-mentioned surface layer, but polyester can be similarly used.

In the glass run channel of the present invention, it is preferred that the strainer portion be composed of the same material as that of body portion.

In the case where the body portion is formed of a modified thermoplastic elastomer, if the strainer portion is formed of the same material, a glass run channel which is practically satisfactory in the durability and the bonding strength to the lubricating resin can be obtained.

On the other hand, in the case where the body portion is formed of an unmodified material, it is preferred that at least a part, close to glass, of the strainer portion be formed of a modified material. However, even in the case where the strainer is completely formed of an unmodified material, if a modified material is laminated in the region including the glass contact part, the lubricating resin can be tightly bonded through this modified material to the strainer portion, and therefore, no problem arises.

Incidentally, in the case where an unmodified material is used for the body portion, an elastomer obtained by dynamically heat-treating in the presence of an organic peroxide a composition which is the same as the starting composition of the above-mentioned modified olefin thermoplastic elastomer except that the modifier is not added is used.

The shark skin pattern which is important for the glass run channel of the present invention can be manifested at the molding step if the properties of the starting thermoplastic elastomer are appropriately selected.

A shark skin is not desired at the ordinary molding operation, but is very important for the glass run channel of the present invention.

The appearance of the obtained rough surface (shark skin) is different from that of the melt fracture (the irregularly disturbed state of the shape of the molded article, which is caused by an abnormal flow), which is sometimes observed at the extrusion molding of a resin or elastomer, and the skin of the molded body is periodically roughened to form fine convexities and concavities.

It is important that this shark skin should be reproduced on the surface of the lubricating resin layer formed on the shark skin, and the lubricating resin layer is laminated so that the thickness of the lubricating resin layer is ordinarily 3 to 50 μm. Of course, the thickness may be increased or decreased according to need.

Since the glass contact part of the strainer portion at the intrusion of the windowpane is ordinarily different from the glass contact part of the strainer portion at the retreat of the windowpane, it is preferred that covering with the lubricating resin and formation of the shark skin be effected over a relatively broad region of the strainer portion.

In the embodiment illustrated in FIG. 1, a part 16 impinging to the end of the windowpane is formed in the interior of the body portion 2. An acid-modified thermoplastic olefin elastomer layer and a surface member layer may also be formed on this part 16.

According to the present invention, the adhesive-coating step, the step of curing or baking the coated adhesive and the embossing step conducted before or after the adhesive-coating operation can be completely omitted, and a glass run channel can be prepared through a small number of steps while shortening the time required for the preparation, and the glass run channel provided according to the present invention is excellent in the durability, the tightness of contact with glass at the time of closing and the sliding smoothness at the opening-closing operation.

The present invention will now be described in detail with reference to the following examples that by no means limit the scope of the invention.

In the present invention, the content ratio between the components (i) and (ii) in the elastomer composition can be determined by the D.S.C. method or the infrared absorbency analysis method. The contents of the components (iv) and (v) in the composition can be determined by the solvent extraction method (Soxhlet extraction method using acetone as the solvent) or the infrared absorbance analysis method.

The content of the grafted component (iii) was measured by the infrared absorbance analysis method or the chemical analysis method.

EXAMPLE 1

A blend comprising 80 parts by weight of an ethylene/propylene/ethylidene-norbornene copolymer rubber having an ethylene content of 70 mole %, an iodine value of 12 and a Mooney viscosity $ML_{1+4}$ (100° C.) of 120 (hereinafter referred to as "EPDM (1)") and 20 parts by weight of polypropylene having a melt flow rate (MFR) (ASTM D-1238-65T, 230° C.) of 13 and a density of 0.91 g/cm$^3$ (hereinafter referred to as "PP")

was kneaded at 180° C. for 5 minutes in a nitrogen atmosphere by a Banbury mixer, and the kneaded blend was passed through rolls and square pellets were prepared by a sheet cutter. Then, the so-obtained pellets were stirred and mixed with 0.3 part by weight of 1,3-bis(tert-butylperoxyisopropyle)benzene (hereinafter referred to as "peroxide (a)"), 0.5 part by weight of divinylbenzene (hereinafter referred to as "DVB") and 0.5 part by weight of maleic anhydride (hereinafter referred to as "MAH") by a Henschel mixer. The mixture was extruded at 220° C. in a nitrogen atmosphere by a monoaxial extruder having an L/D ratio of 30 and a screw diameter of 50 mm to prepare a graft-modified polyolefin elastomer (4). The gel content of the copolymer rubber in the modified polyolefin elastomer (A) was determined according to the above-mentioned method. The measured value is shown in Table 1.

The obtained modified polyolefin elastomer (A) was compression-molded to obtain a sheet for determination of the physical properties. The following physical properties described below were measured. The obtained results are shown in Table 1.

Strength ($T_B$, Kgf/cm$^2$):

According to JIS K-6301, the sample was pulled at a pulling speed of 200 mm/min and the tensile strength at break was measured.

Softness (torsion rigidity, Kgf/cm$^2$):

The torsion rigidity was determined according to the method of ASTM D-1043.

Moldability (MFR, g/10 min):

The melt flow rate was measured at 230° C. under a load of 2.16 kg according to ASTM D-1238.

The modified polyolefin elastomer (A) was extruded in the form of a sheet by a T-die extrusion molding machine having a diameter of 90 mm (supplied by Toshiba Kikai, full-flight screw, L/D=22, extrusion temperature=220° C., T-die of the coat hanger type) at a take-up speed of 2.5 m/min. The extruded modified polyolefin elastomer in the form of a molten sheet is laminated with a polyamide sheet (nylon 6 marketed under the tradename of "Amilane CM1021" by Toray, thickness=0.5 mm) and the laminate was passed through a pair of rolls in such a manner that the modified polyolefin elastomer fell in contact with a roll maintained at 60° C. and the polyamide fell in contact with a roll maintained at room temperature, whereby a laminate comprising a modified polyolefin elastomer layer having a thickness of 1.0 mm and a polyamide layer having a thickness of 0.5 mm was obtained. The interlaminar bonding strength of the obtained laminate was determined under the following conditions. The results are shown in Table 1.

Test piece: Width of 25 mm, length of 100 mm
Test method: 180° peeling
Pulling speed: 25 mm/min
Bonding strength:

Value (kg/cm) obtained by dividing the peeling load by the width of the test piece Incidentally, the sample where the base was broken is indicated by "broken".

COMPARATIVE EXAMPLE 1

The procedures of Example 1 were repeated in the same manner except that the amount incorporated of maleic anhydride was changed to zero.

EXAMPLE 2

The procedures of Example 1 were repeated in the same manner except that the amount of peroxide (a) was changed to 0.6 part by weight and the amount of maleic anhydride was changed to 2.0 parts by weight.

EXAMPLE 3

The procedures of Example 1 were repeated in the same manner except that in preparing the modified polyolefin elastomer (A), in addition to EPDM (1) and PP, butyl rubber (IIR-065 supplied by Esso, unsaturation degree of at least 0.8 mole %) (hereinafter referred to as "IIR") and a paraffinic oil were incorporated as shown in Table 1.

EXAMPLE 4

The procedures of Example 3 were repeated in the same manner except that 0.5 part by weight of glycidyl methacrylate was incorporated instead of 0.5 part by weight of maleic anhydride.

EXAMPLE 5

The procedures of Example 3 were repeated in the same manner except that the amounts of EPDM (1), PP, IIR, the oil and maleic anhydride were changed as shown in Table 1.

EXAMPLES 6 and 7

The procedures of Example 3 were repeated in the same manner except that the amounts of EPDM (1), PP, IIR, the oil and maleic anhydride or glycidyl methacrylate were changed as shown in Table 1 and the amount of peroxide (a) was changed to 1.0 part by weight in Example 6 or 1.5 parts by weight in Example 7. The obtained results are shown in Table 1.

TABLE 1

| | E1 | R1 | E2 | E3 | E4 | E5 | E6 | E7 | E17 | E18 |
|---|---|---|---|---|---|---|---|---|---|---|
| Composition (parts by weight) of Modified Poly olefin Elastomer | | | | | | | | | | |
| EPDM(1) | 80 | 80 | 80 | 80 | 80 | 60 | 90 | 70 | 80 | 80 |
| Polypropylene | 20 | 20 | 20 | 20 | 20 | 40 | 10 | 30 | 20 | 20 |
| Butyl Rubber | — | — | — | 10 | 10 | 20 | 20 | 40 | 10 | 10 |
| Oil | — | — | — | 30 | 30 | 40 | 40 | 60 | 30 | 30 |
| Maleic Anhydride | 0.5 | — | 2.0 | 0.5 | — | 0.5 | — | 6 | — | — |
| Glycidyl Methacrylate | — | — | — | — | 0.5 | — | 3 | — | — | 3 |
| Hydroxypropylmethacrylate | — | — | — | — | — | — | — | — | 0.5 | — |
| Gel content (wt. %) | 97 | 94 | 98 | 96 | 95 | 78 | 98 | 92 | 95 | 98 |
| Physical Properties of Modified | | | | | | | | | | |
| Strength $T_B$ (Kgf/cm$^2$) | 85 | 82 | 87 | 75 | 78 | 110 | 57 | 87 | 77 | 76 |
| Softness, torsion rigidity (kgf/cm$^2$) | 70 | 73 | 70 | 55 | 56 | 350 | 35 | 73 | 58 | 59 |
| Moldability (g/10 min) | 0.5 | 0.6 | 0.2 | 3.0 | 3.0 | 27 | 18 | 35 | 3.5 | 3.2 |

TABLE 1-continued

| | E1 | R1 | E2 | E3 | E4 | E5 | E6 | E7 | E17 | E18 |
|---|---|---|---|---|---|---|---|---|---|---|
| Bondability of Laminate | | | | | | | | | | |
| Bonding Strength (Kg/cm) | broken | 0 | broken | broken | broken | 9.0 | broken | broken | broken | broken* |

Note
E: Example
R: Comparative Example
*polyester sheet

EXAMPLE 8

A graft-modified polyolefin elastomer was prepared in the same manner as described in Example 1 except that the amounts of EPDM (1) and PP were changed to 75 parts by weight and 25 parts by weight, respectively. The gel content of the obtained elastomer is shown in Table 2.

In the same manner as described in Example 1, a test sheet was prepared from the obtained elastomer and the physical properties were measured. The obtained results are shown in Table 2.

The modified polyolefin elastomer was extruded in the form of a sheet by a T-die extrusion molding machine having a diameter of 90 mm (supplied by Toshiba Kikai, full-flight screw, L/D=22, extrusion temperature=220° C., T-die of the coat hanger type) at a take-up speed of 2.5 m/min. The extruded modified polyolefin elastomer in the form of a molten sheet is laminated with a polyurethane sheet (Thermoplastic Polyurethane P26SRNAT supplied by Nippon Polyurethane, thickness=0.5 mm) and the laminate was passed through a pair of rolls in such a manner that the modified polyolefin elastomer fell in contact with a roll maintained at 60° C. and the polyurethane fell in contact with a roll maintained at room temperature, whereby a laminate comprising a modified polyolefin elastomer layer having a thickness of 1.0 mm and a polyurethane layer having a thickness of 0.5 mm was obtained. The interlaminar bonding strength of the obtained laminate was determined under the same conditions as described in Example 1. The results are shown in Table 2.

COMPARATIVE EXAMPLE 2

The procedures of Example 8 were repeated in the same manner except that the amount incorporated of maleic anhydride was changed to zero.

EXAMPLE 9

The procedures of Example 8 were repeated in the same manner except that the amount of peroxide (a) was changed to 0.6 part by wight and the amount of maleic anhydride was changed to 2.0 parts by weight.

EXAMPLE 10

A modified polyolefin elastomer was prepared in the same manner as described in Example 3, and by using this elastomer, a laminate was prepared in the same manner as described in Example 8.

EXAMPLE 11

The procedures of Example 10 were repeated in the same manner except that 0.5 part by weight of glycidyl methacrylate was incorporated instead of 0.5 part by weight of maleic anhydride.

EXAMPLE 12

The procedures of Example 10 were repeated in the same manner except that 0.5 part by weight of hydroxypropyl methacrylate was incorporated instead of 0.5 part by weight of maleic anhydride.

EXAMPLE 13

The procedures of Example 12 were repeated in the same manner except that a foamed polyurethane sheet having a foaming ratio of 40 and a thickness of 4 mm was used instead of the polyurethane sheet.

EXAMPLE 14

The procedures of Example 10 were repeated in the same manner except that the amounts of EPDM (1), PP, IIR, the oil and maleic anhydride were changed as shown in Table 2.

EXAMPLE 15

The procedures of Example 8 were repeated in the same manner except that the amount of peroxide (a) was changed to 0.9 part by weight and the amount of maleic anhydride was changed to 3.5 parts by weight.

TABLE 2

| | E8 | R2 | E9 | E10 | E11 | E12 | E13 | E14 | E15 |
|---|---|---|---|---|---|---|---|---|---|
| Composition (parts by weight) of Modified Polyolefin Thermoplastic Elastomer | | | | | | | | | |
| EPDM(1) | 75 | 75 | 75 | 75 | 75 | 75 | 75 | 55 | 75 |
| PP | 25 | 25 | 25 | 25 | 25 | 25 | 25 | 45 | 25 |
| IIR | — | — | — | 10 | 10 | 10 | 10 | 20 | 10 |
| Oil | — | — | — | 30 | 30 | 30 | 30 | 40 | 30 |
| Maleic Anhydride | 0.5 | — | 2.0 | 0.5 | — | — | — | 0.5 | 3.5 |
| Glycidyl Methacrylate | — | — | — | — | 0.5 | — | — | — | — |
| Hydroxypropyl Methacrylate | — | — | — | — | — | 0.5 | 0.5 | — | — |
| Bondability of Laminate | | | | | | | | | |
| Gel Content (% by weight) of EPDM(1) | 97 | 96 | 98 | 96 | 97 | 97 | 96 | 55 | 98 |

TABLE 2-continued

|  | E8 | R2 | E9 | E10 | E11 | E12 | E13 | E14 | E15 |
|---|---|---|---|---|---|---|---|---|---|
| Strength, $T_B$ (kgf/cm$^2$) | 98 | 96 | 97 | 85 | 83 | 83 | 81 | 145 | 95 |
| Softness, torsion riggity (Kgf/cm$^2$) | 80 | 83 | 80 | 65 | 67 | 65 | 66 | 420 | 81 |
| Moldability, MFR (g/10 min) | 1.0 | 1.1 | 0.7 | 4.0 | 4.3 | 4.1 | 4.0 | 3.5 | 0.5 |
| Bonding Strength | broken | 0 | broken | broken | broken | broken | broken | 9.0 | broken |

Note
E: Example
R: Comparative Example
E13*: Laminated with formed polyurethene

EXAMPLE 16

This Example illustrates the composition and structure of the glass run channel according to the present invention.

A graft-modified polyolefin elastomer prepared in the same manner as described in Example 8 was triple-extrusion-molded at 230° C. to form a body portion and a strainer portion, and a nylon (6-Nylon A1030 supplied by Unitica) was extrusion-molded at 240° C. on the surface of the strainer portion while forming a shark skin on the surface of the strainer portion, whereby a glass run channel of the present invention was obtained.

This channel had a substantially trapezoidal shape, and the total length of the inclined and horizontal portions was 1500 mm, the length of the vertical portion was 90 mm (no bottom side portion), the outer width of the bottom was 15 mm, the outer height of the side portion was 20 mm, and the distance between the strainer portions was 10 mm. The cross-sectional shape was substantially the same as that shown in FIG. 1. The shark skin on the surface of the strainer portion was uniform and the thickness of the nylon layer was 30 μm on the average.

The time required for formation of this channel was shorter by 0.2 minute per meter than the time required in the conventional method (60% of the time required in the conventional method).

The channel was attached to a test window frame and a windowpane (3.2 mm in thickness) was fitted to the channel, and the durability test was carried out. The channel of the present invention could resist the test where the windowpane was brought up and down 50,000 times, and after this durability test, the channel retained the performances. On the other hand, in case of the conventional product, the glass contact surface was broken when the windowpane was brought up and down 25,030 times, and as the result, the frictional resistance to glass was drastically increased and the glass run channel could not be practically used any longer.

EXAMPLE 17

The procedures of Example 3 were repeated in the same manner except that hydroxylpropyl methacrylate was used instead of maleic anhydride. The results are shown in Table 1.

EXAMPLE 18

The procedures of Example 3 were repeated in the same manner except that the amount of peroxide (a) was changed to 1 part by weight, 3 parts by weight of glycidyl methacrylate was used instead of 0.5 part by weight of maleic anhydride and a polyester sheet (Rumilar supplied by Toray, thickness=0.1 mm) was used instead of the polyamide sheet. The results are shown in Table 1.

We claim:
1. A glass run channel having in the cross-section thereof a grooved body portion and a tongue shaped strainer portion expanded from the vicinity of the top of the side wall of the grooved body portion toward the center, which is composed of an olefinic thermoplastic elastomer, wherein at least a part, falling in contact with glass, of the surface of the strainer portion is laminated with a lubricating resin layer through a modified olefin thermoplastic elastomer layer having repeated fine convexities and concavities on the surface thereof so that the repetition of the fine convexities and concavities is retained on the surface of the lubricating resin layer, wherein the modified olefin thermoplastic elastomer is (a) a partially cross-linked graft-modified polyolefin elastomer formed by dynamically heat-treating a blend comprising (i) 10 to 100 parts by weight of a peroxide-cross-linking olefin copolymer, (ii) 0 to 90 parts by weight of an olefinic plastic, the sum of the amounts of the components (i) and (ii) being 100 parts by weight, and (iii) 0.01 to 10 parts by weight of at least one monomer selected from the group consisting of (1) an unsaturated carboxylic acid and a derivative thereof, (2) an unsaturated epoxy monomer and (3) an unsaturated hydroxyl monomer, in the presence of an organic peroxide, and the lubricating resin is (b) a polyamide, polyurethane or polyester.

2. A glass run channel as set forth in claim 1, wherein the blend (a) further comprises (iv) 0 to 100 parts by weight of a peroxide-non-cross-linking rubbery substance having a Mooney viscosity smaller than 60, (v) 0 to 100 parts by weight of a mineral oil softener, or both (iv) and (v).

3. A glass run channel as set forth in claim 1, wherein the peroxide-cross-linking olefinic plastic (i) of the partially cross-linked graft-modified polyolefin elastomer (a) is an ethylene/propylene/ethylidene norbornene copolymer.

4. A glass run channel as set forth in claim 1, wherein the amount of the peroxide-cross-linking olefin copolymer rubber (i) is 60 to 95 parts by weight and the amount of the olefinic plastic (ii) is 5 to 40 parts by weight, the sum of the amounts of the components (i) and (ii) being 100 parts by weight.

5. A laminate as set forth in claim 4, wherein the amount of the monomer (ii) is 0.1 to 5 parts by weight.

6. A glass run channel as set forth in claim 1, wherein the blend (a) further comprises at least one of (iv) a peroxide-non-cross-linking rubbery substance in an amount of from 5 to 50 parts by weight and (v) a mineral oil softener in an amount from 3 to 100 parts by weight.

7. A glass run channel as set forth in claim 6, wherein the peroxide-non-cross-linking rubbery substance (iv) is present.

8. A glass run channel as set forth in claim 6, wherein the mineral oil softener (v) is present.

9. A glass run channel as set forth in claim 3, wherein the molar ratio between ethylene units and propylene units in the elastomer (a) is from about 55/45 to 85/15.

10. A glass run channel as set forth in claim 1, wherein the monomer (iii) is maleic acid, bicyclo(2,2,1-)hept-2-ene-5,6-dicarboxylic acid or an anhydride of either of these acids.

11. A glass run channel as set forth in claim 1, wherein the monomer (iii) is said unsaturated epoxy monomer selected from the group consisting of glicodyl esters of unsaturated monocarboxylic acids, monoglycidyl esters of unsaturated polycarboxylic acids, diglicodyl esters of unsaturated polycarboxylic acids, and unsaturated glidcodyl ethers.

12. A glass run channel as set forth in claim 1, wherein the monomer (iii) is hydroxylethylacrylate, hydroxylethylmethacrylate, hydroxypropylacrylate or hydroxypropylmethacrylate.

13. A glass run channel as set forth in claim 1, wherein the lubricating resin is a polyamide.

14. A glass run channel as set forth in claim 1, wherein the lubricating resin is a polyurethane.

15. A glass run channel as set forth in claim 1, wherein the lubricating resin is a polyester.

16. A glass run channel as set forth in claim 1, wherein the thickness of the thermoplastic elastomer layer (a) is from 0.1 to 50 mm and the thickness of the lubricating resin (b) is from 3 to 50 microns.

17. A glass run channel as set forth in claim 1, wherein the body portion and strainer portion of the glass run channel are formed from the same modified olefin thermoplastic elastomer forming the glass contacting portion laminated to the strainer portion.

18. A glass run channel as set forth in claim 1, wherein the body portion and strainer portion are both formed from a non-graft-modified polyolefin elastomer formed by dynamically heat-treating a blend of the same peroxide-cross-linking olefin copolymer (i) and olefinic plastic (ii) used to form the modified olefin thermoplastic elastomer (a).

* * * * *